Nov. 10, 1970 D. H. ETTINGER 3,539,758
VERSATILE STUD WELDING GUN
Filed June 24, 1968 2 Sheets-Sheet 1
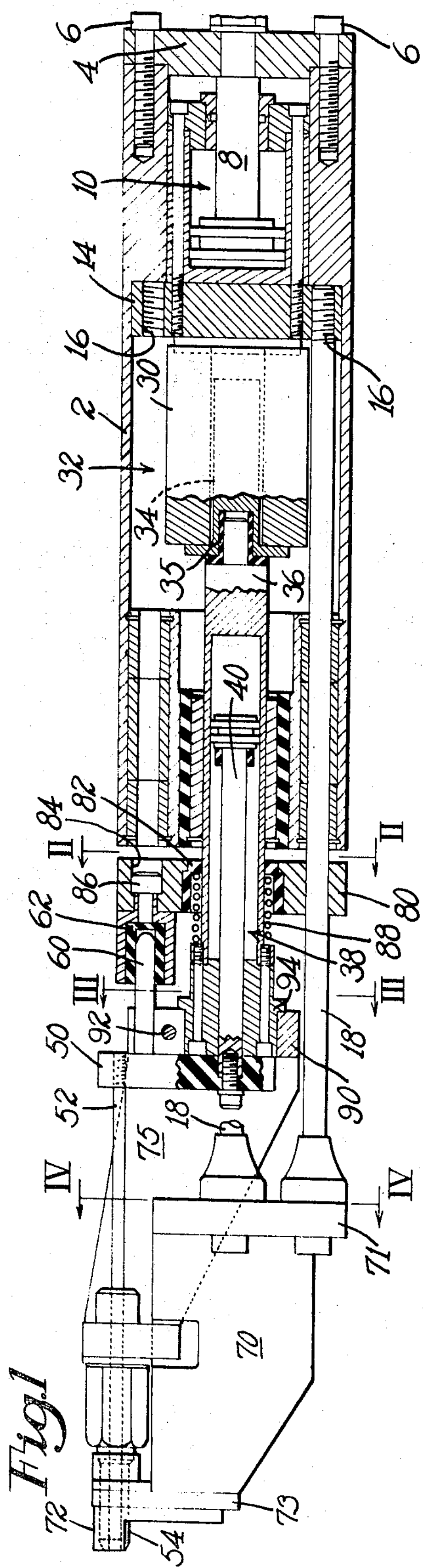
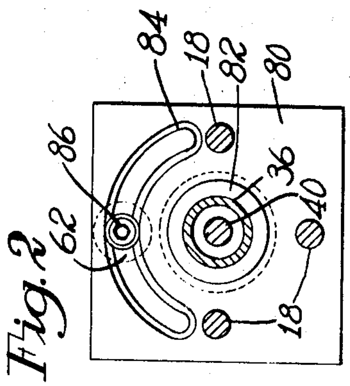
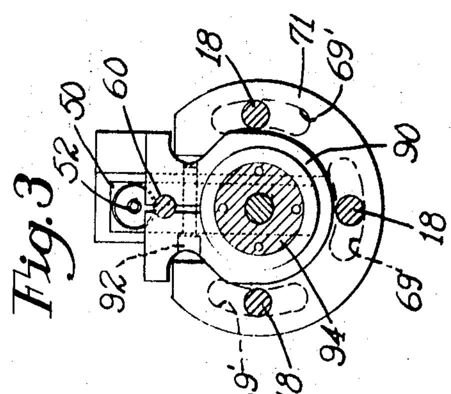
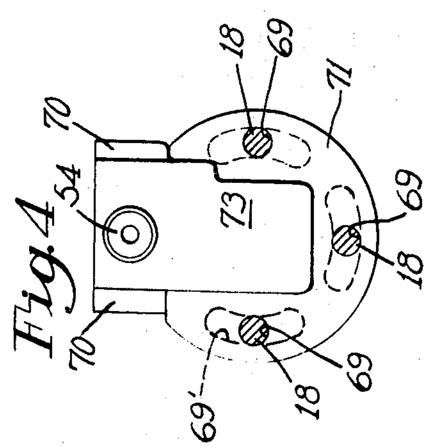
Inventor
Donald H. Ettinger
By his Attorney
Robert A Jensen VERSATILE STUD WELDING GUN
Filed June 24, 1968 2 Sheets-Sheet 2
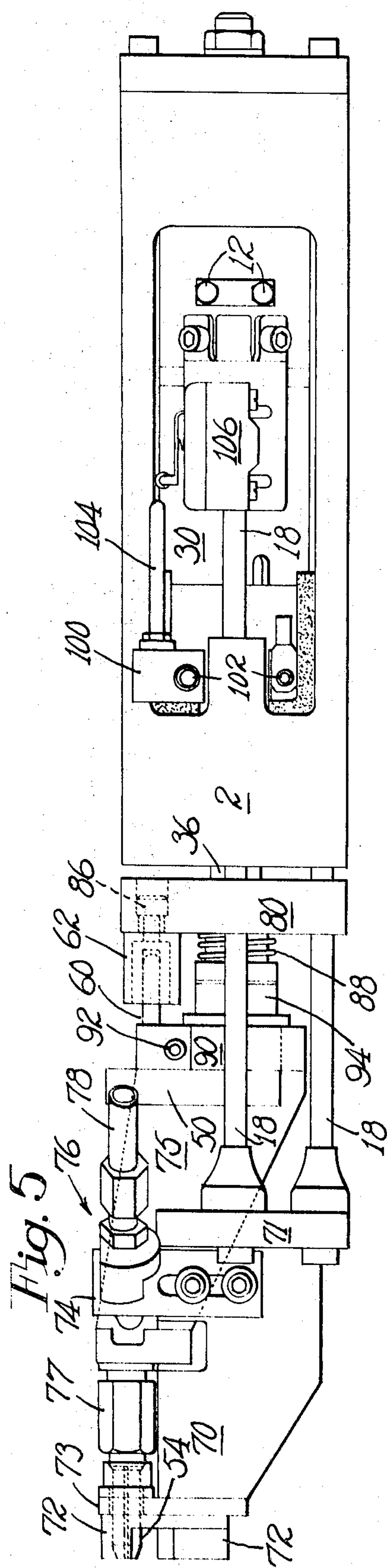
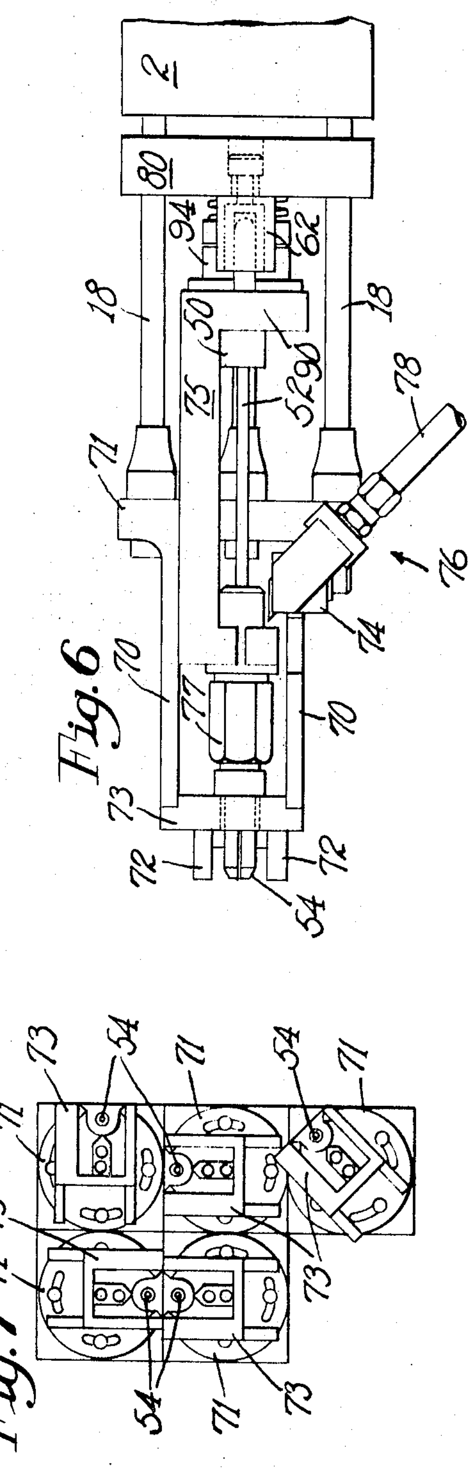
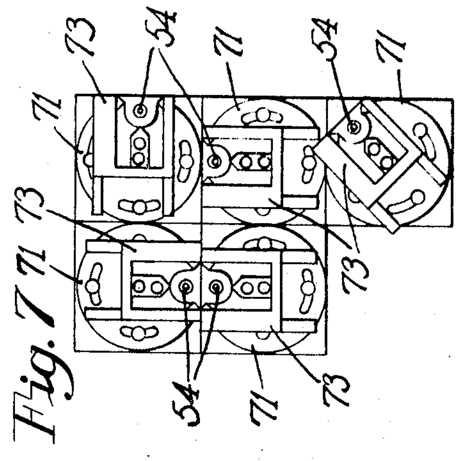

United States Patent Office 3,539,758

Patented Nov. 10, 1970

1

3,539,758

VERSATILE STUD WELDING GUN

Donald H. Ettinger, Royal Oak, Mich., assignor to Warren Fastener Corporation, Mount Clemens, Mich., a corporation of Michigan Filed June 24, 1968, Ser. No. 739,272
Int. Cl. B23k 9/20
U.S. Cl. 219—98 3 Claims

ABSTRACT OF THE DISCLOSURE

A versatile arc welding gun of the type wherein studs are automatically fed to the welding position and there secured to the recipient structure. The gun is designed so that the collet is offset from the axis of an elongated housing and said collet is rotatable through 360° by a combination of guide rods which may be arranged in a different pattern changing the general location of the collet and angular adjustment of the collet within the location determined by the position of the guide rods.

BACKGROUND OF THE INVENTION

It is known that in many instances such as where rust or leakage is a problem the use of a stud attached by welding is preferable to one attached by insertion through a preformed hole. It is in this type of a circumstance wherein an arc welding gun of the type described is used to best advantage.

The commercial stud welding guns are supplied with studs, either by hand one stud at a time or automatically one at a time through a pneumatic tube and feeder combination. The stud is welded in place by placing the foot piece or face of the welding gun against the work surface, thus forming one electrical contact, placing the stud to be welded against the same surface forming the other electrical contact and discharging the gun through the stud. The stud is drawn away from the surface during the discharge, forming an arc of sufficient temperature to melt the interface and weld the stud to the material in the proper position. The arc welding of studs to a planar surface by this process has generally been satisfactory. There has been the general problem that if the studs were to be placed in close groupings, each stud had to be welded individually rather than by means of a bank or plurality of stud welders mounted upon a frame and operating simultaneously.

The stud welders available prior to the present invention have had the collet, which holds the stud during the welding process, located along the axis of the gun housing. This location of the collet is generally satisfactory for individual welding of studs in position and for the automatic welding of a plurality of studs in position by a pre-arranged bank of arc welders, but as pointed out above, has the limitation that the studs cannot be closely grouped because of the dimensions of the gun housings.

Thus, it is an object of the present invention to provide a stud welding gun wherein the gun can be placed in a bank of similar guns and the studs to be welded can be congregated in close groupings.

In accordance with this object and as a feature of the invention, the arc welding gun is provided with a collet which is offset from the axis of the gun housing.

It is another object of the present invention to provide a stud welding gun wherein the collet is angularly adjustable throughout the full 360° spectrum about the axis of the housing.

In accordance with this object and as a further feature of the invention, there is provided a combination of adjustments which include the relocation of a plurality of guide rods in conjunction with angular adjustment of the offset collets within the limitation prescribed by the location of the guide rods.

2

The above and other features of the invention including various novel details of construction and combinations of parts will now be more particularly described with reference to the accompanying drawings and pointed out in the claims.

BRIEF DESCRIPTION OF THE DRAWINGS

FIG. 1 is a top view partially in section of one form of an automatic versatile stud welding gun in which the invention is embodied.

FIG. 2 is a section through FIG. 1 along the line II—II.

FIG. 3 is a section through FIG. 1 along the line III—III.

FIG. 4 is a section through FIG. 1 along the line IV—IV.

FIG. 5 is a top view of the complete welding gun showing a foot piece in position, the stud feeding attachment and the switching mechanism.

FIG. 6 is a side view of the adjustable portion of the gun.

FIG. 7 schematically shows a configuration of stud welding positions made possible by the present invention.

DESCRIPTION OF THE PREFERRED EMBODIMENT

Referring to FIGS. 1 and 5, the automatic welding gun comprises a housing 2 which is hollow and generally of square cross-section. Mounted to the rear portion of the housing is a cap 4 rigidly secured by bolts 6 and having secured thereto the piston 8 of an air motor 10, having air connections 12 (see FIG. 5). The air motor 10 provides means for moving the welding instrumentalities toward and away from the work and thus enables mounting of the guns for use in a mass production assembly line. A plurality of the guns may be rigidly secured in a bank or cluster at a position along the assembly line with each welding gun having its piston located relative to its cylinder, as shown in FIG. 1. Upon the arrival of the object to which the studs are to be applied, air under pressure is supplied to the air motor 10 to move the cylinder toward the left relative to the piston whereupon the entire welding assembly, described below, moves outwardly of the housing 2 to contact the recipient surface.

Secured to the forward end of the cylinder of the air motor 10 is a plate 14 slidable within the housing 2 and having a plurality of threaded holes 16 to receive guide rods 18 for purposes to be later described. Rigidly fastened to the plate 14 is the coil 30 of a solenoid 32 having an armature 34. Connected to the armature 34 but electrically shielded therefrom by an insert 35 is a cylinder 36 of an air motor 38 having a piston and rod 40.

Mounted on the forward end of the rod 40 is a block 50 which transfers motion of the piston rod 40 to a push rod 52 which extends forwardly of the welding gun into a collet 54 slidable in an insulating bushing in an end piece 73 of a foot piece 70. The foot piece 70 is carried by the forward ends of the guide rods 18 passing through holes 69 in an attaching flange 71, the end plate 73 of which serves both as one of the poles in the arc welding process and as a guide and locating means for offsetting the collet 54 radially from the longitudinal axis of the housing 2. As shown in FIG. 5, a plurality of spacer blocks 72 extend forwardly from the end piece 73 of the foot piece 70 and serve both to protect the collet from impact damage and to contact the work piece during the weld.

As seen in FIGS. 5 and 6, for delivering successive studs forwardly of the push rod 52 when the latter is retracted there is an automatic stud feeding attachment comprising a block 74 adjustably secured to the foot piece 70 and carrying a connector assembly 76 through which and the block 74 a stud is fed into a tube 77 supporting the rearward end of the collet 54. The tube 77 is in turn carried by a flange of a collet supporting plate 75. Attached to the connector assembly 76 is an electrically insulative tube 78 which receives the studs from any one of a number of commercially available stud feeding sources. The studs are pneumatically forced one at a time through the connector assembly 76 into position to be pushed forwardly into the collet 54 by means of the rod 52, the block 50 and the air motor 38.

Mounted upon the guide rods 18 forwardly of the housing of the welding gun is a support block 80, having three separate holes for the guide rods to pass through and a central bore large enough to accommodate the cylinder 36 of the air motor 38. Carried by the support block 80 surounding the air motor 38 and shielding the support block from said air motor is a counterbored insulative bushing 82, the purpose of which will become apparent.

The illustrative mechanism is designed to use three guide rods 18 to support the foot piece 70 and guide the collet assembly during the welding operation, but has provisions for positioning the rods differently with respect to the housing 2, thereby to select the angular position of the collet 54 with respect to the housing 2. For this purpose, the plate 14 is provided with more rod receiving apertures 16 than there are guide rods, and, as illustrated, there are four such apertures. By unscrewing the rods from the apertures 16, the entire nose assembly including the plate 80 may be removed from the housing 2, turned until the rods are in alignment with a different combination of three apertures 16, and reassembled. Thus, with four such apertures, adjustment of the collet in increments of 90° about the axis of the gun are made possible. If the number of threaded apertures is increased, it will be understood that a greater number of angular operating positions of the collet assembly relatively to the housing 2 may be selected.

The plate 80 is provided with an arcuate slot 84 which adjustably receives a reduced rearwardly extending portion of a bushing 62 locked in the desired position of adjustment by a set screw 86. The bushing 62 supports a guide rod 60 clamped by a screw 92 to a flange 90 of the collet supportive plate 75. The bushing 62 has a lining of insulative material. The bushing 62 and the set screw 86 serve not only to lock the collet supportive plate with the collet in the desired angular position relative to the housing 2 but also assist in providing the support necessary to assure rigidity of the offset collet mechanism during the reciprocation inherent to the arc welding process. For enabling compact assembly in a gun bank, each collet is adjustably disposed within the projected cross sectional area, substantially of its gun body.

It will be obvious that with a collet which is radially offset and adjustable in increments throughout the 360° spectrum that the foot piece 70 may be angularly adjustable between the 90° positions by forming the holes 69 as circularly disposed arcuate slots 69', as shown in broken lines in FIGS. 3 and 4.

Acting between a flange of the insulative bushing 82 of the support block 80 and a bushing 94 clamped by the screw 92 in the flange 90 of the collet support 75 is a compression spring 88, which biases the air motor 38 forwardly of the solenoid 30.

As shown in FIG. 5, mounted to the upper portion of the air motor 38 is an air manifold 100 having air connections 102 leading to opposite sides of the piston of the air motor, and rigidly mounted upon the rear portion of the manifold is a rod 104 for actuating a firing switch 106.

The illustrative welding gun is designed for use in a group or bank of similar guns. The desired stud location upon a panel will determine the location of the collets of the various guns, see for example, FIG. 7.

OPERATION OF THE MECHANISM

The illustrative machine is designed upon a four position support and guidance basis. That is, the plate 14 axially movable with respect to the casing 2, has four different locations (threaded holes 16) to receive the supporting guide rods 18 but only three of these positions are used at a time. The four threaded holes are equidistant from the center axis of the casing and are located at the four points of the compass. Thus the collet may be angularly shifted for offset operation in any one of four positions by moving the three guide rods 18 to a different group of three of the four threaded holes 16.

Once the guide rods are secured in position, the collet may be further adjustably moved to a position other than that directly along the line of the missing guide rod, i.e., within the quadrant of the then inoperative hole 16, by loosening set screw 86 and moving the bushing 62 to any position within the arcuate slot 84 in support block 80. In installations where the gun will be used in a bank which places studs in the same relative position upon a number of panels, the collet position will be determined and a custom foot piece provided to accommodate that position. In an installation where the stud position will vary, the foot piece may well be provided with arcuate slots 69' as shown in broken lines in FIG. 3. By the combination of different guide rod groupings and arcuate slots it is possible to use the welding gun as illustrated in FIG. 7 in compact arrangement in a bank of such tools at any selected collet position throughout the 360° spectrum.

As mentioned above, there are two electrically insulated portions of the tool, the one portion comprising the collet 54 and the stud held therein, the collet support 75, the flange 90, the bushing 94 and the air motor 38. The second assembly comprises the spacer blocks 72, the foot piece 70 with its base 71 and the guide rods 18 as well as the remainder of the casing 2. These two insulated portions serve as the two electrical poles which when properly charged, by a suitable welding circuit not shown, cause the arcing which in turn causes the weld.

In operation the foot piece 70 is moved by the air motor 10 toward the material to which the stud is to be welded with the collet 54 in the proper stud location (adjusted as described above). The spacer blocks 72 are held in contact with the stud receiving material and a stud is fed through the feed tube 78 into position within the collet and against the work piece.

A slight discharge of the stored electrical current in the welding circuit is then begun and the solenoid 32 energized. The movement of the armature 34 within the solenoid draws the entire air motor 38 towards the rear of the welding gun to the position shown in FIG. 5, and since the mounting plate 75 is rigidly connected to the casing 36 of the air motor 38, likewise draws the collet 54 and the stud held therein away from the work piece. The manifold 100 being rigidly fastened to the casing 36 of the air motor 38 likewise moves toward the rear of the welding gun until the firing switch actuating rod 104 contacts the firing switch 106, which completes the discharge causing sufficient heat to form a pool of liquid metal at the stud attaching point. At this time the solenoid 32 is deenergized, allowing the spring 88 to immediately force the stud against the work piece where the liquid metal solidifies and holds the stud in place.

It will be understood that the particular machine embodying the invention is shown by way of illustration only and not as a limitation of the invention. The principles and features of this invention may be employed in varied and numerous embodiments without departing from the scope of the invention.

Having thus described my invention, what I claim as new and desire to secure by Letters Patent of the United States is:

1. In an arc welding gun of the type wherein studs are automatically fed to a recipient surface successively to be electrically welded in place;

(a) a main body portion including a housing having a central axis (b) a first assembly of conductive material reciprocably mounted within the housing and extending outwardly of the housing comprising:

(i) a plate having a plurality of equally spaced holes, said plate being secured to the inward end of the first assembly (ii) a plurality of rods disposed about the housing axis to mate with selected ones of the holes and extend outwardly thereof (iii) a foot piece secured to the outward ends of the rods to contact the stud receiving surface, and (c) a second assembly of conductive material electrically insulated from said first assembly and extending outwardly of the first assembly for reciprocable movement with the first assembly and for reciprocable and angular movement relative thereto, said first assembly having means for guiding movement of the second assembly and the latter including collet supporting means for adjustably holding each successive stud offset from said housing axis during the welding process.

2. A welding gun as in claim 1 wherein the number of holes in the plate is greater than the number of mating rods.

3. A welding gun as in claim 1 wherein the foot piece is mounted for angular adjustment with respect to the rods.

References Cited

UNITED STATES PATENTS 2,250,448 7/1941 Edwards ----------- 287—129

FOREIGN PATENTS 299,524 10/1928 Great Britain.

JOSEPH V. TRUHE, Primary Examiner

R. E. O'NEILL, Assistant Examiner

U.S. Cl. X.R.

287—129